United States Patent Office 2,767,803
Patented Oct. 23, 1956

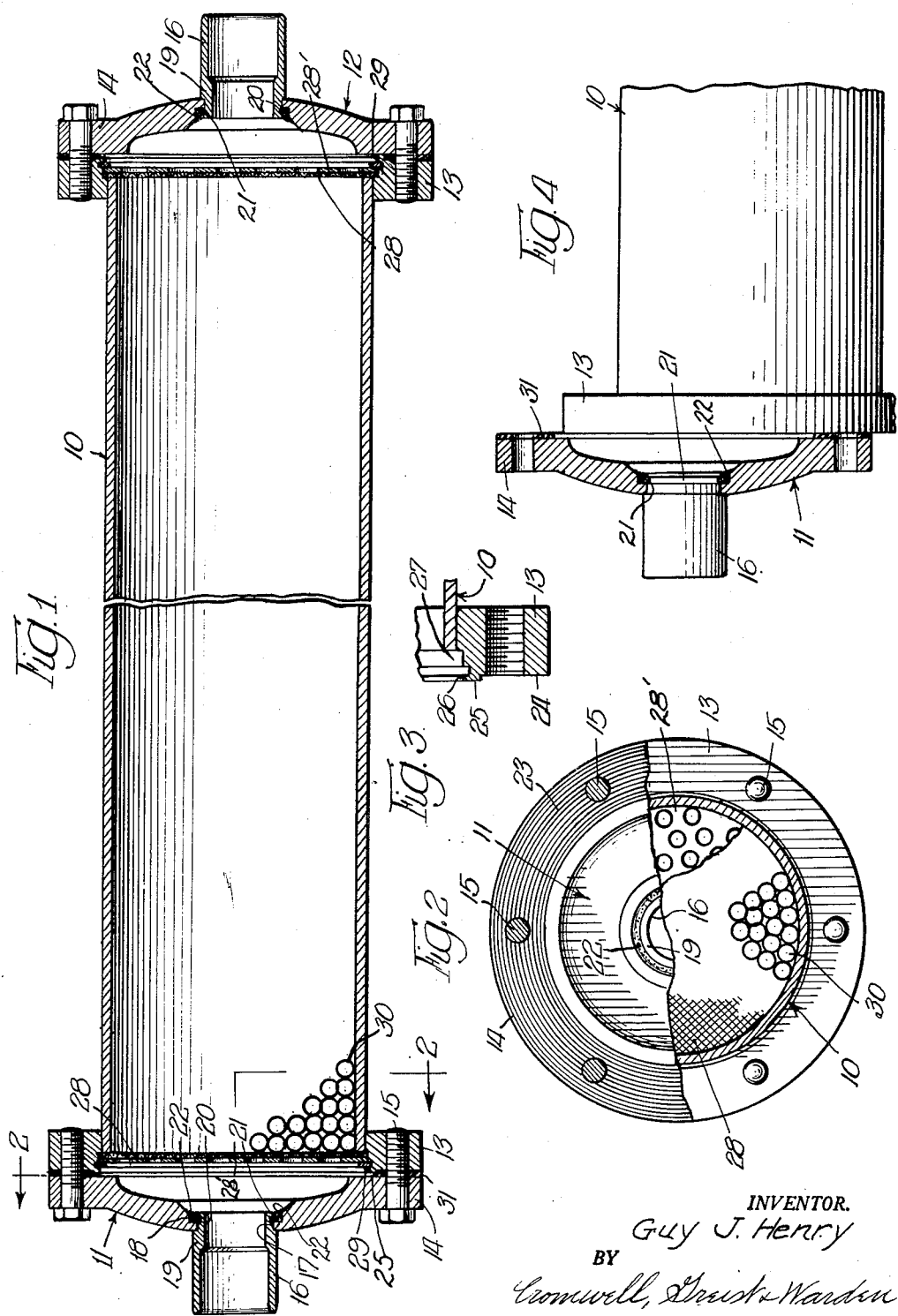

2,767,803

STRAINER CASING CONSTRUCTION

Guy J. Henry, Arlington Heights, Ill.; The Northern Trust Company and Bessie D. Henry, executors of the estate of said Guy J. Henry, deceased, assignors to Henry Valve Company, Incorporated, Melrose Park, Ill., a corporation of Illinois Application December 11, 1952, Serial No. 325,359

7 Claims. (Cl. 183—4.8)

The present invention relates to improvements in the construction of a casing for a strainer or drier of the type employed in refrigeration and like fluid handling systems to remove foreign matter and impurities from, and/or dry, a refrigerant gas or other fluid circulating in the system.

Strainers or driers of this general type are well known, being usually characterized by a tubular strainer casing or body of considerable length having flanged intake and discharge fittings removably applied to coacting flanges on opposite ends thereof, by which fittings the strainer is fixedly coupled in the piping of a fluid handling line. In various familiar constructions the casing is axially nested, keyed or axially interfitted to some extent with reference to the fittings, requiring relative endwise shifting of the body and fittings to disengage the former from the piping to which the latter are attached.

It is necessary to remove the strainer body from time to time from the fluid line for the purpose of cleaning or servicing or recharging a drier with fresh desiccant, such as activated alumina or silica gel. In systems in which the piping is not particularly large and rigid, it is usually possible to separate the pipe attached fittings from the strainer body, in an endwise direction, and without disturbing the union of the pipe and fittings sufficiently to enable the casing to be bodily shifted laterally out of alignment and engagement with the fittings.

However, in the case of systems in which the piping is heavy and rigid, or rigidly anchored in one way or another against endwise movement, the above procedure is not possible. Accordingly, it is a general object of the present invention to provide an improved strainer construction featuring a tubular casing body and aligned intake and discharge fittings in end abutting relation to radial flanges on opposite ends of the body, in an arrangement enabling quick and easy removal and replacement of the casing without disturbing the existing piping or fitting-piping connection in any degree, regardless of the degree of rigidity of the installation, and without spilling drying agent from the body.

More specifically, it is an object of the invention to provide an improved casing construction of the sort described in which the casing is comprised of an elongated tubular body provided with fixed flange rings at its opposite ends for axially aligned clamping engagement with intake and discharge fittings, the flanges and fittings being specially shaped and related to one another at their meeting planes to enable removal of the body and its flanges by simple transverse shifting of the body normal to the axis of the casing.

Yet another and still more specific object of the invention is to provide an improved end fitting construction for a strainer or drier casing of the type discussed above, characterized by the provision of a flat inner, radially extending flange surface on a fitting member for coaction with a radial surface of a casing flange which is also substantially flat, save for the presence of a small annular gasket clamping shoulder, the flange surfaces enabling the casing to be dropped out of a fluid handling line without disturbing the latter.

Yet another specific object is to provide a construction as outlined in the preceding paragraph, in which the end fitting member is provided with novel means to hold the same in proper relation to a pipe nipple, or like part adapted to couple the casing with the fluid handling line, in preparation for and during the operation of permanently securing the fitting member to the nipple.

A still further object is to provide a fitting-nipple connection in accordance with the preceding paragraph, in which a centrally apertured, flanged plate type fitting and a peripherally grooved tubular nipple are telescopingly associated and held in telescoped relation by a snap ring occupying the nipple groove and acting in the manner of a fixture to hold the fitting and nipple for completion of a permanent solder union therefor.

The foregoing statements are indicative in a general way of the nature of the invention. Other and more specific objects will be apparent to those skilled in the art upon a full understanding of the construction of the improved unit.

A single embodiment of the invention is presented herein for purpose of illustration, yet it will be appreciated that the invention may be incorporated in other modified forms coming equally within the scope of the appended claims.

In the drawings:

Fig. 1 is a view in longitudinal axial section through an improved drier casing embodying the principles of the invention;

Fig. 2 is a view in transverse vertical section along the broken section line 2—2 of Fig. 1, further illustrating internal structural details;

Fig. 3 is a fragmentary view in longitudinal section, on an enlarged scale, showing a detail of construction of a casing flange ring which clamps a gasket between the same and an end fitting; and Fig. 4 is a fragmentary side view, partially in longitudinal vertical section through a flanged end fitting of the casing, illustrating the manner in which the casing body is transversely shifted to remove the same from assembly with the fitting without disturbing the position of the latter.

As appears from the above, the invention provides a strainer or drier construction which eliminates the nested, axially interfitted relationship of end fitting and casing body found in the usual construction, enabling the body to be removed transversely, upon removal of bolts securing the same to an end fitting, without previous endwise disengagement of the parts. Referring to Fig. 1 of the drawings, the unit chosen for illustration comprises an elongated, hollow cylindrical casing body 10 and intake and discharge end closure fittings 11, 12 bolted to opposite ends thereof. Inasmuch as these fittings are identical in their construction and relationship to body 10, like reference numerals are employed to designate like parts at opposite ends of the unit.

A relatively heavy clamp ring 13 is welded to each end of body 10, its outer face projecting substantially beyond the outer end of the body. Fittings 11 and 12 are radially outwardly flanged at 14 and provided with openings, aligned with corresponding threaded openings in flange ring 13, through which bolts 15 extend to releasably clamp the fitting and body in fixed relation.

A feature of the invention resides in the improved means for assembling the fittings 11 and 12 with an adapter or nipple 16 by which the casing is mounted in a fluid handling line. Each fitting is centrally bored at 17 and counterbored at 18 to telescopingly receive nipple 16, and a thickened end portion 19 of the nipple is provided with an outer annular groove 20 immediately adjacent its casing end. This groove is machined in a reduced outer diameter at the nipple end.

In assembling nipple 16 to the fitting, the nipple is inserted in fitting bore 17 until the annular shoulder adjoining its reduced outer diameter abuts the fitting. A nipple retaining means such as a split contractile snap ring 21 is now applied to nipple groove 20, within counterbore 18, and it holds the nipple in fixed position in bore 17 by locking against the radial lip formed by the counterbore. Silver solder 22 is now flowed into counterbore 18 and built up to appropriate depth in the latter about snap ring 21. This completes the assembly of the nipple and fitting. The operation is quickly and easily performed and insures accurate axial alignment of the parts.

As illustrated in Fig. 2, the inner face of each of the fittings 11, 12 is provided over the major portion of its surface with a series of fine annular serrations 23 in close concentric relation, extending outwardly to the periphery of flange 14. Referring to Fig. 3 of the drawings, the coacting, outwardly facing surface 24 of flange ring 13 is flat over the major portion of its area, i. e., in an annular zone terminating at its outer periphery; however a slightly raised annular ledge or gasket clamping shoulder 25 of small radial width is formed on surface 24 immediately adjacent its inner radial limit. The inner periphery of flange ring 13 is annularly grooved and countergrooved at 27 to define a radially inwardly extending retainer lip 26 for a split expansible snap ring 29, by which a circular screen 28 is held in place in groove 27. Screen 28 is preferably reinforced by a circular perforated plate 28' secured externally thereto by spotwelding, thereby stiffening the screen adequately to confine a desiccant loaded into the casing. Assuming that the unit is to function as a drier, the interior of the casing body 10 between screens 28 is filled with a suitable desiccant, such as activated alumina or silica gel, etc., generally designated by the reference numeral 30.

This completes the improved construction. When bolts 15 are taken up the clamping shoulder 25 on the flange ring 13 exerts high unit pressure on an annular gasket 31 interposed between the ring and fitting flange 14, clamping the gasket tightly against the serrated fitting flange 14 to insure against leakage at the joint of the fitting and casing body. This is done without recourse to the usual mechanical interlock of the parts by axial nesting; accordingly, when it is desired to remove casing body 10 from the fluid handling line for servicing, cleaning, recharging with desiccant 30, or the like, this is quickly and simply accomplished by removing bolts 15, whereupon the cylindrical casing part may be bodily shifted transversely, as illustrated in Fig. 4, out of assembly with the coacting fittings 11, 12, which remain fixedly in place, of the fluid line. There is no need for displacing the same axially for the dismantling operation. Restoration of body 10 is correspondingly simple. In view of the fact that frequent recharging, cleaning servicing are performed, it is evident that the improved casing construction is a great saver of time in a long period of use. The same holds true with regard to the saving of time which in manufacturing is permitted by the illustrated and described arrangement of structural features, particularly the method of connecting the end fittings and nipples.

The improved construction described above also facilitates packing desiccant 30 in the casing 10. In this operation, a screen unit 28, 28' is applied to one end of the casing body, in end abutment with the extremity of the latter. A snap ring 29 is then engaged in the internal counter-groove of flange ring 13 to hold the screen unit in place. The body is now up-ended and filled with the drying agent 30, being then placed in a vibrator and vibrated to compact the agent. When the body is full, the second screen unit 28, 28' is applied and held in place by a second snap ring 29.

This produces a unitary casing body which may be dropped out of the line, as illustrated in Fig. 4 of the drawings, without spilling of desiccant 30. If the latter is to be replaced or replenished, it is a simple matter to remove one of the screens for this purpose. Upon refilling, the casing is then slipped back into place in the line without requiring particular attention to contain the desiccant pellets. The invention thus provides an improved article of manufacture in the form of a cartridge-type strainer casing having particular utility in facilitating, expediting the servicing of a fluid handling line.

I claim:

1. An end construction for a tubular strainer casing comprising an annular flange ring rigidly secured to an end of said casing in encircling relation thereto, said flange ring having an internal diameter greater than that of said casing and being provided with a substantially flat, axially facing outer end surface having a small outwardly projecting annular shoulder adjacent its inner periphery, said casing end being axially exposed within and overhung by said end surface of said flange ring, an end fitting provided with an annular flat, axially facing flange surface in face-to-face relation to the end surface of said flange ring, a gasket between said surfaces, a screen axially abutted with said casing end, a removable ring sustained axially by said shoulder and holding said screen in said end abutting position, and means securing said fitting to said flange ring and clamping said gasket between said fitting surface, said flange ring end surface and said flange ring shoulder.

2. An end construction for a tubular strainer casing comprising an annular flange ring rigidly secured to an end of said casing in encircling relation thereto, said flange ring having an internal diameter greater than that of said casing and being provided with a substantially flat, axially facing outer end surface, said flange ring having an internal annular groove located inwardly of said end surface and defining an annular internal end lip on said flange ring, said casing end being axially exposed within and overhung by said end surface of said flange ring, an end fitting provided with an annular flat, axially facing flange surface in face-to-face relation to the end surface of said flange ring, a gasket between said surfaces, a screen axially abutted with said casing end, a removable ring sustained axially by said end lip and holding said screen in said end abutting position, and means securing said fitting to said flange ring and clamping said gasket between said fitting surface and said flange ring end surface.

3. A strainer construction for a tubular strainer casing comprising an annular flange ring welded to an end of said casing in encircling relation thereto, said flange ring having an internal diameter greater than that of said casing and being provided with a substantially flat, axially facing outer end surface and an annular shoulder radially inward of said surface, said flange ring having an internal annular groove located axially immediately to the rear of said shoulder and defining an annular internal end lip on said flange ring, said casing end being axially exposed within and overhung by said end surface of said flange ring, an end fitting provided with an annular flat, axially facing flange surface in face-to-face relation to the end surface of said flange ring, a gasket between said surfaces, a plurality of bolts securing said fitting to said flange ring and clamping said gasket between said fitting surface and said flange ring end surface, a screen disposed in axial abutment with said casing end, and a snap ring sustained axially by said flange ring end lip and holding said screen in place against said casing end.

4. A strainer construction for a tubular strainer casing comprising an annular flange ring welded to an end of said casing in encircling relation thereto, said flange ring having an internal diameter greater than that of said casing and being provided with a substantially flat, axially facing outer end surface having a small outwardly projecting annular shoulder adjacent its inner periphery, said flange ring having an internal annular groove located axially immediately to the rear of said shoulder and defining an annular internal end lip on said flange ring, said casing end being axially exposed within and overhung by said end surface of said flange ring, an end fitting provided with an annular flat, axially facing flange surface in face-to-face relation to the end surface of said flange ring, a gasket between said surfaces, a plurality of bolts securing said fitting to said flange ring and clamping said gasket between said fitting surface, the end surface of said flange ring and said flange ring shoulder, a screen disposed in axial abutment with said casing end, and a snap ring sustained axially by said flange ring end lip and holding said screen in place against said casing end.

5. A strainer construction comprising a hollow tubular body having an open end provided with an outer annular flange which axially overhangs said body with said end thereof axially exposed within the flange, said flange having a radially extending, substantially flat end surface, said flange surface having a concentric annular shoulder of small radial width extending endwise therefrom, said tubular body being provided with an internal annular groove located axially to the rear of said shoulder, a strainer screen in abutment with said body end and a snap ring in said groove axially retaining the screen, which snap ring is restrained axially by the shoulder, a fitting associated with said flange, said fitting being provided with an annular, substantially flat, radially extending surface disposed in face-to-face relation to said flange end surface, and means securing said fitting to said flange.

6. An end construction for a tubular strainer casing comprising an annular flange ring rigidly secured to an end of said casing in encircling relation thereto, said flange ring having an internal diameter greater than that of said casing and being provided with a substantially flat axially facing outer end surface, said casing end being radially and axially exposed within and overhung by said ring, an end closure fitting provided with an annular flat axially facing flange surface in face-to-face relation to the end surface of said flange ring, a gasket between said surfaces, a screen of an outer diameter greater than the inner diameter of said casing end, said screen being axially abutted with the radial face of said casing end, a snap ring in interlocked relation with said casing end releasably holding said screen in said end abutting position to allow ready removal of said screen from said casing upon the gaining of access thereto, and means removably securing said end closure fitting to said flange ring and clamping said gasket between said end closure fitting surface and said flange ring surface.

7. A strainer construction comprising a hollow tubular casing having an open end provided with an outer annular flange which axially overhangs said casing with said end thereof radially and axially exposed within the flange, said flange being provided with an internal annular groove located inwardly of the end thereof, a strainer screen of an outer diameter greater than the inner diameter of said casing in abutment with the radial face of said casing end, a snap ring in said groove axially retaining said screen and adapted to allow ready removal of said screen from said casing upon the gaining of access thereto, an end closure fitting disposed in face-to-face relation to said flange, and means removably securing said fitting to said flange.

References Cited in the file of this patent

UNITED STATES PATENTS

| | | |
|---|---|---|
| 940,870 | Gordon | Nov. 23, 1909 |
| 1,161,078 | Slade | Nov. 23, 1915 |
| 1,270,045 | Murray | June 18, 1918 |
| 1,299,396 | Coleman | Apr. 1, 1919 |
| 1,348,667 | Snyder | Aug. 3, 1920 |
| 1,409,364 | Dobbs et al. | Mar. 14, 1922 |
| 1,612,526 | Mueller | Dec. 28, 1926 |
| 1,681,955 | Scaife | Aug. 28, 1928 |
| 1,771,949 | Blanchard | July 29, 1930 |
| 2,183,614 | Henry | Dec. 19, 1939 |
| 2,225,990 | Henry | Dec. 24, 1940 |
| 2,283,989 | Henry | May 26, 1942 |
| 2,323,160 | Stecher et al. | June 29, 1943 |
| 2,446,481 | Letterman | Aug. 3, 1948 |
| 2,577,009 | Frantz | Dec. 4, 1951 |
| 2,577,606 | Conley | Dec. 4, 1951 |
| 2,593,132 | Gannon | Apr. 15, 1952 |

FOREIGN PATENTS

| | | |
|---|---|---|
| 353,374 | Great Britain | July 23, 1931 |
| 449,250 | Germany | Jan. 15, 1926 |